(12) United States Patent
Chapman (10) Patent No.: US 9,871,817 B2
(45) Date of Patent: Jan. 16, 2018

(54) SOCIAL ENGINEERING SIMULATION WORKFLOW APPLIANCE

(71) Applicant: Mark T. Chapman, Muskego, WI (US)

(72) Inventor: Mark T. Chapman, Muskego, WI (US)

(73) Assignee: Phishline, LLC, Waukesha, WI (US)

( * ) Notice: Subject to any disclaimer, the term of this patent is extended or adjusted under 35 U.S.C. 154(b) by 0 days.

(21) Appl. No.: 15/610,884

(22) Filed: Jun. 1, 2017

(65) Prior Publication Data

US 2017/0264633 A1    Sep. 14, 2017

Related U.S. Application Data (62) Division of application No. 15/015,482, filed on Feb. 4, 2016, now Pat. No. 9,699,207.

(60) Provisional application No. 62/112,503, filed on Feb. 5, 2015, provisional application No. 62/114,744, filed
(Continued)

(51) Int. Cl.
*H04L 29/06* (2006.01)
*G06F 21/62* (2013.01)

(52) U.S. Cl.
CPC ...... *H04L 63/1433* (2013.01); *G06F 21/6245* (2013.01); *H04L 63/1483* (2013.01)

(58) Field of Classification Search
CPC .................. H04L 63/1433; H04L 63/1483
See application file for complete search history.

(56) References Cited

U.S. PATENT DOCUMENTS

| | | |
|---|---|---|
| 5,892,903 A | 4/1999 | Klaus |
| 6,954,858 B1 | 10/2005 | Welborn et al. |
| 7,490,356 B2 | 2/2009 | Lieblich et al. |

(Continued)

FOREIGN PATENT DOCUMENTS

KR    10-2013-0035572    4/2013

OTHER PUBLICATIONS

Jagatic et al.; Social phishing; Published in: Magazine Communications of the ACM CACM Homepage archive; vol. 50 Issue 10, Oct. 2007: pp. 94-100; ACM Digital Library.*
(Continued)

*Primary Examiner* — Bradley Holder
(74) *Attorney, Agent, or Firm* — Reinhart Boerner Van Deuren P.C.

(57) ABSTRACT

A system for evaluating the susceptibility of an organization to social engineering, the organization having a plurality of sources and a plurality of members using electronic devices, is provided. The system includes an appliance in communication with the plurality of sources configured to retrieve contact information of members and to detect triggering events from the plurality of sources. The system includes a platform remote from the appliance configured to receive signals from the appliance indicative of the triggering events and to prepare and send communications, including templates based on each of the triggering events to the appliance. Upon receipt of the communications, the appliance is configured to retrieve the contact information of intended recipient members, to create messages based on the templates, and to send the messages to the intended recipient members. The platform does not receive the contact information of the plurality of members from the appliance.

9 Claims, 3 Drawing Sheets

Related U.S. Application Data on Feb. 11, 2015, provisional application No. 62/135,990, filed on Mar. 20, 2015.

(56) References Cited

U.S. PATENT DOCUMENTS

| | | | | |
|---|---|---|---|---|
| 7,698,442 | B1* | 4/2010 | Krishnamurthy | G06F 21/51 709/203 |
| 7,769,820 | B1* | 8/2010 | Spies | H04L 63/08 709/218 |
| 7,788,723 | B2 | 8/2010 | Huddleston | |
| 7,802,298 | B1* | 9/2010 | Hong | G06F 21/51 705/51 |
| 7,865,958 | B2 | 1/2011 | Lieblich et al. | |
| 7,971,246 | B1 | 6/2011 | Emigh et al. | |
| 7,984,500 | B1* | 7/2011 | Khanna | G06F 21/552 709/225 |
| 8,028,335 | B2* | 9/2011 | Udezue | G06F 21/51 726/22 |
| 8,079,087 | B1* | 12/2011 | Spies | G06F 17/30873 709/205 |
| 8,209,760 | B1* | 6/2012 | Hardman | G06F 21/577 726/25 |
| 8,245,304 | B1* | 8/2012 | Chen | G06F 21/51 370/233 |
| 8,296,376 | B2 | 10/2012 | Goldberg et al. | |
| 8,332,918 | B2 | 12/2012 | Vedula et al. | |
| 8,464,346 | B2 | 6/2013 | Barai et al. | |
| 8,484,741 | B1* | 7/2013 | Chapman | G06Q 10/0635 709/206 |
| 8,910,287 | B1 | 12/2014 | Belani et al. | |
| 9,224,117 | B2* | 12/2015 | Chapman | G06Q 10/0635 |
| 2002/0091940 | A1 | 7/2002 | Welborn et al. | |
| 2005/0132225 | A1 | 6/2005 | Gearhart | |
| 2005/0183143 | A1* | 8/2005 | Anderholm | G06F 11/32 726/22 |
| 2006/0271631 | A1 | 11/2006 | Qureshi et al. | |
| 2007/0294352 | A1 | 12/2007 | Shraim et al. | |
| 2008/0047017 | A1 | 2/2008 | Renaud | |
| 2008/0271124 | A1 | 10/2008 | Nisbet et al. | |
| 2008/0288330 | A1 | 11/2008 | Hildebrand et al. | |
| 2009/0172772 | A1 | 7/2009 | Souille | |
| 2009/0318130 | A1 | 12/2009 | Naylor et al. | |
| 2010/0125911 | A1 | 5/2010 | Bhaskaran | |
| 2010/0138925 | A1 | 6/2010 | Barai et al. | |
| 2010/0235918 | A1 | 9/2010 | Mizrahi et al. | |
| 2010/0299292 | A1 | 11/2010 | Collazo | |
| 2011/0061089 | A1 | 3/2011 | O'Sullivan et al. | |
| 2011/0184877 | A1 | 7/2011 | McHugh et al. | |
| 2012/0124671 | A1 | 5/2012 | Fitzson et al. | |
| 2012/0258437 | A1 | 10/2012 | Sadeh-Koniecpol et al. | |
| 2013/0110614 | A1 | 5/2013 | Wagner et al. | |
| 2013/0145465 | A1 | 6/2013 | Wang et al. | |
| 2013/0198846 | A1* | 8/2013 | Chapman | G06Q 10/0635 726/25 |
| 2013/0203023 | A1 | 8/2013 | Sadeh-Koniecpol et al. | |
| 2013/0297375 | A1* | 11/2013 | Chapman | G06Q 10/0635 705/7.28 |
| 2014/0199663 | A1 | 7/2014 | Sadeh-Koniecpol et al. | |
| 2014/0199664 | A1 | 7/2014 | Sadeh-Koniecpol et al. | |
| 2014/0230064 | A1 | 8/2014 | Higbee et al. | |

OTHER PUBLICATIONS

Quercia et al.; Sybil Attacks Against Mobile Users: Friends and Foes to the Rescue; Published in: INFOCOM, 2010 Proceedings IEEE; Date of Conference: Mar. 14-19, 2010; IEEE Xplore.*
U.S. Appl. No. 15/015,482, filed Feb. 4, 2016.
Exhibit 1002, Declaration of Dr. Markus Jakobsson, filed on Jun. 8, 2015 in IPR2015-01356 of U.S. Pat. No. 8,484,741, United States Patent and Trademark Office, Patent Trial and Appeal Board.
Exhibit 1003, PhishMe: The Easy Way to Enhance Employee Phishing Awareness, filed on Jun. 8, 2015 in IPR2015-01356 of U.S. Pat. No. 8,484,741, United States Patent and Trademark Office, Patent Trial and Appeal Board.
Exhibit 1004, Measuring the Human Factor of Cyber Security, filed on Jun. 8, 2015 in IPR2015-01356 of U.S. Pat. No. 8,484,741, United States Patent and Trademark Office, Patent Trial and Appeal Board.
Exhibit 1005, How to Create a Self-Signed Digital Certificate in Microsoft Office 2010, filed on Jun. 8, 2015 in IPR2015-01356 of U.S. Pat. No. 8,484,741, United States Patent and Trademark Office, Patent Trial and Appeal Board.
Exhibit 1006, Fostering E-Mail Security Awareness: The West Point Carrondade, filed on Jun. 8, 2015 in IPR2015-01356 of U.S. Pat. No. 8,484,741, United States Patent and Trademark Office, Patent Trial and Appeal Board.
Exhibit 1007, U.S. Pat. No. 8,296,376 to International Business Machines Corporation, filed on Jun. 8, 2015 in IPR2015-01356 of U.S. Pat. No. 8,484,741, United States Patent and Trademark Office, Patent Trial and Appeal Board.
Exhibit 1008, U.S. Patent Publication No. US2013-0110614, filed on Jun. 8, 2015 in IPR2015-01356 of U.S. Pat. No. 8,484,741, United States Patent and Trademark Office, Patent Trial and Appeal Board.
Exhibit 1009, U.S. Patent Publication No. US2009-0318130, filed on Jun. 8, 2015 in IPR2015-01356 of U.S. Pat. No. 8,484,741, United States Patent and Trademark Office, Patent Trial and Appeal Board.
Exhibit 1010, U.S. Pat. No. 8,332,918 to Novell, Inc., filed on Jun. 8, 2015 in IPR2015-01356 of U.S. Pat. No. 8,484,741, United States Patent and Trademark Office, Patent Trial and Appeal Board.
Document 1, Petition for Inter Partes Review of U.S. Pat. No. 8,484,741, filed on Jun. 8, 2015 in IPR2015-01356 of U.S. Pat. No. 8,484,741, United States Patent and Trademark Office, Patent Trial and Appeal Board.
Document 2, Petitioner Phishme, Inc.'s Power of Attorney, filed on Mar. 24, 2014 in IPR2014-00531 of U.S. Pat. No. 8,484,741, United States Patent and Trademark Office, Patent Trial and Appeal Board.
Document 3, Notice of Filing Date Accorded to Petition and Time for Filing Patent Owner Preliminary Response, filed on Apr. 4, 2014 in IPR2014-00531 of U.S. Pat. No. 8,484,741, United States Patent and Trademark Office, Patent Trial and Appeal Board.
Document 4, Chapman Technology Group Inc's Power of Attorney in an Inter Partes Review, filed on Apr. 4, 2014 in IPR2014-00531 of U.S. Pat. No. 8,484,741, United States Patent and Trademark Office, Patent Trial and Appeal Board.
Document 5, Chapman Technology Group Inc's Power of Attorney in an Inter Partes Review, filed on Apr. 4, 2014 in IPR2014-00531 of U.S. Pat. No. 8,484,741, United States Patent and Trademark Office, Patent Trial and Appeal Board.
Document 6, Chapman Technology Group Inc's Mandatory Notices, filed on Apr. 4, 2014 in IPR2014-00531 of U.S. Pat. No. 8,484,741, United States Patent and Trademark Office, Patent Trial and Appeal Board.
Document 7, Chapman Technology Group Inc's Preliminary Response to Petition for Inter Fades Review under 37 C.F.R. § 42.107, filed on Jul. 1, 2014 in IPR2014-00531 of U.S. Pat. No. 8,484,741, United States Patent and Trademark Office, Patent Trial and Appeal Board.
Document 8, Decision—Institution of Inter Partes Review, filed on Sep. 3, 2014 in IPR2014-00531 of U.S. Pat. No. 8,484,741, United States Patent and Trademark Office, Patent Trial and Appeal Board.
Document 9, Scheduling Order, filed on Sep. 3, 2014 in IPR2014-00531 of U.S. Pat. No. 8,484,741, United States Patent and Trademark Office, Patent Trial and Appeal Board.
Document 10, Patent Owner Chapman Technology Group, Inc.'s Proposed Motions, filed on Sep. 30, 2014 in IPR2014-00531 of U.S. Pat. No. 8,484,741, United States Patent and Trademark Office, Patent Trial and Appeal Board.
Document 11, Petitioner Phishme Inc.'s Proposed Motions, filed on Sep. 30, 2014 in IPR2014-00531 of U.S. Pat. No. 8,484,741, United States Patent and Trademark Office, Patent Trial and Appeal Board.
Document 12, Initial Conference Summary—Conduct of the Proceeding 37 C.F.R. § 42.5, filed on Oct. 2, 2014 in IPR2014-00531

(56) References Cited

OTHER PUBLICATIONS of U.S. Pat. No. 8,484,741, United States Patent and Trademark Office, Patent Trial and Appeal Board.
Steve Sheng; "Who Falls for Phish? A Demographic . . . "; 2010; 10 pages; Carnegie Mellon University, Indraprastha Institute of Information Technology.
Quercia et al.; Sybil Attacks Against Mobile Users: Friends and Foes to the Rescue; Published in: INFOCOM, 2010 Proceedings IEEE; Date of Conference: Mar. 14-19, 201 O; IEEE Xplore.

* cited by examiner

SOCIAL ENGINEERING SIMULATION WORKFLOW APPLIANCE

CROSS-REFERENCE TO RELATED PATENT APPLICATIONS

This patent application is a divisional of U.S. patent application Ser. No. 15/015,482, filed Feb. 4, 2016, which claims the benefit of U.S. Provisional Patent Application No. 62/112,503, filed Feb. 5, 2015; U.S. Provisional Patent Application No. 62/114,744, filed Feb. 11, 2015; and U.S. Provisional Patent Application No. 62/135,990, filed Mar. 20, 2015, each of which are hereby incorporated by reference in their entirety.

BACKGROUND OF THE INVENTION

The present invention relates generally to susceptibility to social engineering such as phishing and more specifically to systems and software services for testing and/or reducing the susceptibility of an organization to social engineering.

Social engineering includes manipulation, such as psychological manipulation, of people into performing actions or divulging confidential information, for example, information that people would not normally disclose. Such information can be used for various nefarious purposes, e.g., electronic theft, fraud, etc. One form of social engineering is phishing. Phishing is a technique of fraudulently obtaining confidential information. For example, a phisher may send a message, e.g., e-mail, text, SMS, telephone call, voicemail, pre-recorded message, etc., to a recipient. The message may request the recipient to take some action, e.g., click a link, open and/or download a file, provide confidential information, etc. In the case of a link, the link may take the recipient to a website that requests the recipient to provide confidential information on false pretenses. Other links may take the recipient to a website that is designed to download malicious code onto the recipient's electronic device, e.g., code that captures the recipient's personal information from the electronic device, etc. Phishing messages may be designed to be difficult to identify as such, e.g., the messages may be written, include, information, etc., to appear to originate from a legitimate source.

SUMMARY OF THE INVENTION

One embodiment of the invention relates to a system for evaluating the susceptibility of an organization to social engineering. The organization has a plurality of sources and plurality of members using electronic devices. The system includes an appliance in communication with the plurality of sources. The appliance is configured to receive contact information of the plurality of members from at least one of the sources. The appliance is configured to detect triggering events from the plurality of sources. The system includes a platform remote from the appliance. The platform is configured to receive signals from the appliance indicative of the detected triggering events. The platform is configured to prepare communications including templates based on each of the triggering events. The platform is configured to send the communications to the appliance. Upon receipt of the communications, the appliance is configured to retrieve the contact information of intended recipient members, to create messages based on the templates, and to send the messages to the intended recipient members. The platform does not receive the contact information of the plurality of members from the appliance.

Another embodiment of the invention relates to a method of reducing organizational susceptibility to social engineering. The organization has a plurality of sources. The method includes receiving contact information for a plurality of members of the organization. The method includes monitoring each of the sources for triggering events. The method includes identifying at least one member of the organization as an intended recipient based on a detected triggering event. The method includes preparing a message to the intended recipient based on characteristics of the detected triggering event. The message solicits an action by the intended recipient. The method includes transmitting the message to the intended recipient. The method includes determining whether the intended recipient acts as solicited by the message. The method includes evaluating the action of the intended recipient.

Another embodiment of the invention relates to a system for evaluating the susceptibility to social engineering of an organization having a directory, a plurality of databases, and a messaging system. The system includes an appliance. The appliance is configured to receive an address book having contact information for members of the organization from the directory. The appliance is configured to connect to the plurality of databases and the messaging system. The appliance is configured to monitor the plurality of databases and the messaging system for triggering events. The system includes a platform. The platform is configured to receive signals from the appliance indicative of triggering events identified by the appliance. The platform is configured to create templates based on the signals. The platform is configured to send the templates to the appliance. The appliance is configured to create messages to intended recipients based on the templates. The platform is configured to determine whether the intended recipients take a predetermined action in response to the messages. The platform is configured to compile statistics regarding the triggering events, messages, and intended recipients' actions in response to the messages.

Another embodiment of the invention relates to a system for evaluating the susceptibility of an organization to social engineering. The organization has a plurality of sources and a plurality of members using electronic devices. The system includes an appliance. The appliance is configured to receive an address book from at least one of the sources including identifying information and contact information regarding each of the plurality of members of the organization. The appliance is configured to alias at least some of the identifying information and to replace the contact information with identifiers to create an aliased address book. The information to be aliased is determined based on a predetermined algorithm. The system includes a platform configured to receive the aliased address book from the appliance. The appliance is configured to detect a triggering event from the sources and to transmit an indication of the triggering event to the platform. The platform is configured to provide a communication to the appliance including a message template based on the triggering event, an indication of a delivery mode, a delivery identifier known by the appliance to map to one of the members of the organization, and scheduling instructions. The appliance is configured to create a personalized message based on the template for each of the intended recipients from information in the address book. The appliance is configured to send the messages to one of a plurality of servers separate from the platform based on the type of the message, the one of the servers being configured to send the messages to the intended recipients. The appliance is configured to monitor responses to the messages from the intended recipients. The appliance is configured to alias portions of the responses, leave other portions of the responses un-aliased, and to profile portions of the responses based on a predetermined algorithm and to send the aliased, un-aliased, and profiled portions of the responses to the platform.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring to the figures generally, many organizations, e.g., companies, governments, associations, etc., would like to reduce susceptibility to social engineering. With the proliferation of electronic devices and their use in organizations, many organizations have a plurality of sources of information that provide indications of opportunities, e.g., teachable moments, that are likely to be effective or suitable times and/or situations to launch a social engineering susceptibility evaluation and/or reduction campaign, test, etc. Embodiments of systems described herein are configured to monitor the sources of information for such indications of opportunities and to automatically, e.g., without user intervention, launch social engineering susceptibility evaluation and/or reduction campaigns, tests, etc.

For example, sources may include different networked directories, databases, management systems, messaging systems, and incident response systems. Many organizations may have a plurality of members, e.g., employees, etc., interacting with various portions of the organization. Many of the members use electronic devices, e.g., computers, laptops, smartphones, PDAs, etc. Such electronic devices may be configured to communicate with other electronic devices, the organization, etc., e.g., through the internet, cellular network, organization network, LAN, WAN, Wifi, etc. Many of these devices may be in communication with at least one of the networked directories, databases, management systems, messaging systems, incident response systems, etc., and these directories may contain information regarding the use of the electronic devices. Many different events, such as actions on electronic devices, by members throughout an organization may provide the opportunities, e.g., teachable moments, discussed above.

For example, when certain events or employee actions occur in the organization, following these events or actions shortly thereafter with tests or campaigns to reduce the social engineering susceptibility of the organization, e.g., launched automatically and triggered by the event or employee action, the efficacy of the actions to reduce social engineering susceptibility of the organization may be improved. However, not all of the directories, databases, management systems, messaging systems, and incident response systems in the organization may be aware of the event or employee action. Therefore, in one embodiment, a system is provided that is in communication with many directories, databases, management systems, messaging systems, and incident response systems throughout the organization and the system is configured to take various actions based on information from across the directories, databases, management systems, messaging systems, and incident response systems of the organization.

Additionally, in one embodiment, the system includes an appliance, e.g., a workflow appliance. The workflow appliance is configured to collect information from the sources, e.g., the directories, databases, management systems, messaging systems, and incident response systems in the organization. However, the workflow appliance maintains the collected information at the organization, e.g., in the case of a physical hardware workflow appliance, the appliance remains physically located at the organization and maintains the collected information within the organization, or in the case of a virtual and/or software-implemented workflow appliance, the information collected is maintained within the systems, virtual infrastructure, and/or control of the organization.

Additionally, in one embodiment, the appliance is configured to communicate with an exterior platform such as, for example, a software as a service platform configured to provide social engineering tests or campaigns to decrease the susceptibility of organizations to social engineering and analysis of the tests or campaigns. The appliance gathers identifying information and/or contact information, e.g., e-mail addresses, telephone numbers, mobile telephone numbers, social media identifiers, such as FACEBOOOK account IDs, TWITTER user names, etc., for example, of employees of the organization, such as from directories, databases, management systems, messaging systems, and incident response systems of the organization. The appliance is configured to anonymize the contact information and communicate the anonymized contact information to the platform when a social engineering campaign, test, etc., is to be launched. Therefore, the identities and/or contact information of the members of the organization is maintained within the organization, e.g., is not communicated outside the organization or outside of the organization's control. When the platform is triggered by the appliance to create a template for an intended recipient member of the organization, the platform sends a communication including the template associated with the anonymized contact information to the appliance. The appliance determines the actual contact information from the anonymized contact information, creates a message based on the template, and transmits the message to the intended recipient. Thus, the actual contact information is not communicated outside of the organization, which may be desirable for some organizations.

Figure 1:
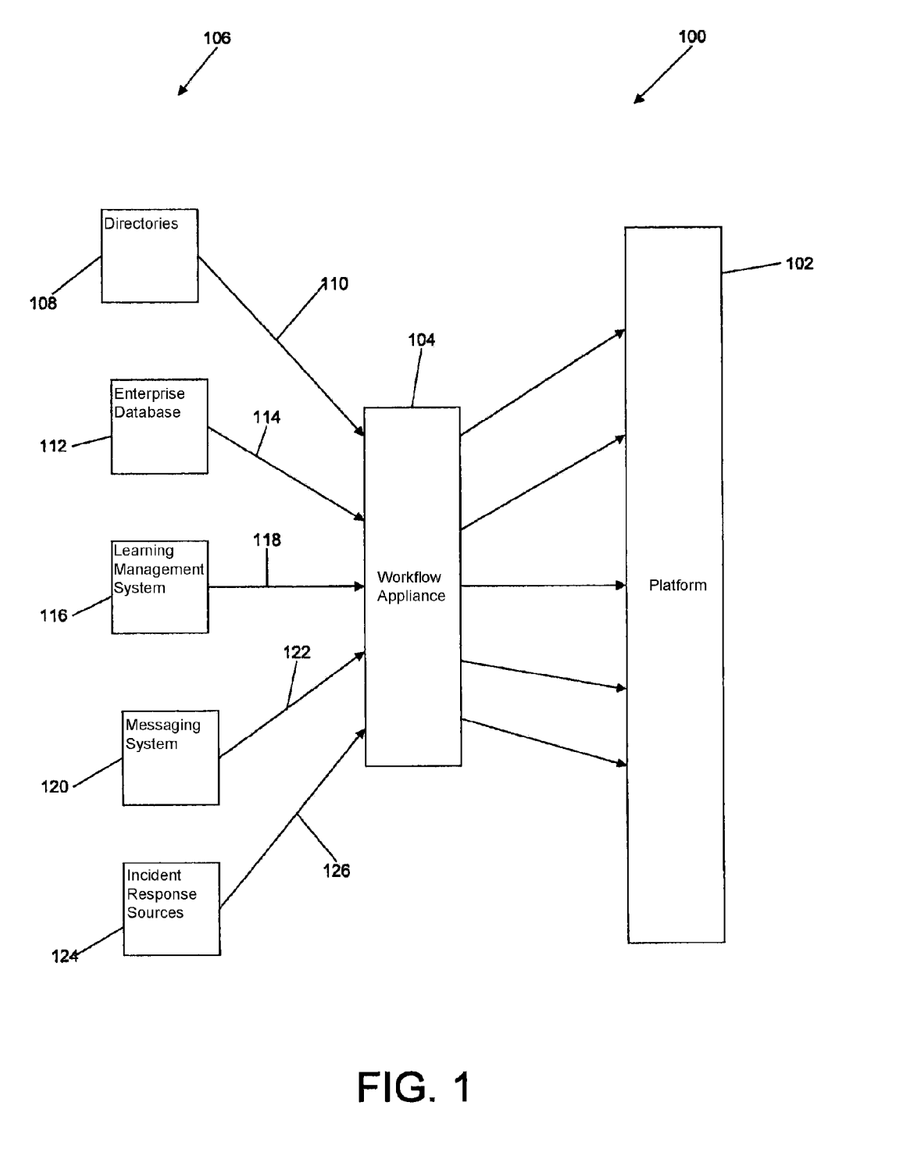
FIG. 1 is a block diagram illustrating a system for testing and/or reducing an organization's susceptibility to social engineering including a workflow appliance according to an exemplary embodiment.

Referring to FIG. 1, an embodiment of a system 100, such as a system for evaluating and/or reducing the susceptibility of an organization to social engineering, is illustrated. The system 100 includes a platform 102 remote from the organization. The platform 102 is a social engineering testing, improvement, and/or susceptibility evaluation platform configured to test an organizations' susceptibility to social engineering, evaluate, analyze, and provide metrics regarding the organizations' susceptibility to social engineering, and train members of the organization to reduce susceptibility to social engineering. The platform 102 is configured to prepare communications, including templates that can be used to create messages that can be delivered to members of the organization via various formats, protocols, devices, etc., such as, for example, e-mail, text, SMS, telephone, voice-mail, etc. The messages solicit the recipient to take an action, for example, click a link, download or upload a file, provide confidential information, manually reply to the message, automatically reply to the message, e.g., "out of office", including cases where the reply or interaction solicited is a reply or interaction via a different communication medium than that through which the message was received, e.g., phone message soliciting e-mail reply, e-mail message soliciting text message reply, etc. In one embodiment, a message may include a link configured to take the recipient to a website that solicits confidential information from the recipient and/or downloads malicious code onto the recipient's electronic device. The platform 102 and/or the workflow appliance 104 are configured to monitor and/or determine whether the recipient takes the solicited action. Additionally, the platform 102 and/or the workflow appliance 104 may be configured to profile, e.g., hash, etc., confidential information (or instruct the recipient's web server to do so), collect the profiled information, and discard the confidential information so that the platform 102 does not collect the confidential information. For example, the platform 102 may collect the number and/or type of characters in the confidential information, but does not collect the confidential information itself. Additionally, the platform 102 is configured to evaluate the collected information, e.g., perform benchmarking, etc., to provide data to inform further training to reduce susceptibility to social engineering. In one embodiment, the platform 102 is implemented as a software as a service platform, e.g., in the cloud, on a server remote from and not controlled by the client organization, etc., with organizations acquiring licenses to use the platform 102. In other embodiments, the platform 102 may be provided in software, hardware, or a combination of software and hardware to an organization.

In one embodiment, the system 100 also includes an appliance, shown as a workflow appliance 104. In one embodiment, the workflow appliance 104 may be a virtual appliance, e.g., implemented in software running on a hypervisor server, VMWare, Microsoft Hyper-V, Citrix XenServer, Oracle VM Virtualbox, GNU/Linux KVM, etc. In another embodiment, the workflow appliance 104 may be a physical appliance including a hardware processor located at the client organization running software configured to implement the functionality of the workflow appliance 104 described below, e.g., Standard Personal computer hardware, a PC or MAC, small appliances like Blackberry PI or could be server-class rack-mount hardware. In either case, in one embodiment, the workflow appliance 104 is in the control of the organization, e.g., physically located at the organization, implemented in software running on servers controlled by the organization, operating on the virtual infrastructure controlled by the organization, inside the organization's environment, etc.

The workflow appliance 104 is in communication with sources 106 of the organization. In one embodiment, the workflow appliance 104 is given limited, read-only access to the sources 106 or portions of the sources. The sources 106 may include directories 108, such as, for example, employee contact information directories, ACTIVE DIRECTORY available from MICROSOFT, Lightweight Directory Access Protocol (LDAP) directories, OpenLDAP directories, as well as alternative identity management services including federated id systems, etc. In one embodiment, the workflow appliance 104 is in communication with each of the directories through a Lightweight Directory Access Protocol (LDAP) connector 110. The sources 106 may also include enterprise databases 112, such as, for example, relational systems such as Oracle Database, Sybase, Microsoft SQL, IBM DB2, Oracle MySQL; non-relational flat-file formats such as comma-separated-values (CSV) or fixed-length format, no-sql technologies such as HADOOP, etc. The workflow appliance 104 is in communication with each of the enterprise databases 112 through a structured query language (SQL) or similar connector 114. The sources 106 may also include learning management systems 116, such as, for example, MOODLE, SCORM CLOUD, MEDIAPRO, etc. The workflow appliance 104 is in communication with each of the learning management systems 116 through a file transfer protocol (FTP) or web services connector 118. The sources 106 may also include messaging systems 120, such as, for example, e-mail systems, text messaging systems, instant messaging systems such as Microsoft Exchange, IBM Collaboration System (Lotus), other email systems using IMAP or POP protocols, other non-email system gateways such as an SMS or telephone gateway, etc. The workflow appliance 104 is in communication with each of the messaging systems 120 through a IMAP/POP or a web services connector 122. The sources 106 may also include incident response sources 124, such as systems or logs, for example, logs of an organization's I.T. support incidents reported, assistance given to members of the organization, etc. Incident response sources may include any server or network solution that provides incident logs via, e.g., Event Logs, Syslog, etc. The workflow appliance 104 is in communication with each of the incident response sources 124 through a connector 126, such as a SYSLOG, database, or web service.

The connectors listed above connecting the workflow appliance 104 to each of the sources are exemplary. In other embodiments, other suitable connectors may be used.

In one embodiment, the workflow appliance 104 is configured to receive contact information for members of the organization from at least one of the sources 106. For example, an e-mail address book for the organization may be transferred from at least one of the sources 106 to the workflow appliance 104. In one embodiment, telephone numbers, instant messaging information, and/or other contact information for members of the organization may be transferred from the sources 106 to the workflow appliance 104. However, because the workflow appliance 104 is under the control of the organization, the contact information is not transferred outside of the organization and/or outside of the organization's control. In one embodiment, contact information for members of the organization may include, for example, telephone numbers for members of the organization (e.g., for voice phishing testing), mobile phone numbers for members of the organization (e.g., by which SMS text messaging may be sent to members of the organization for SMS phishing testing), and/or social media identifiers for members organization, e.g., FACEBOOK account identifier, TWITTER username, etc.

In one embodiment, the identification information may include or be associated with attributes, e.g., risk-based profile information. For example, one attribute may be an indication of employees' department, division, location, language, etc. Additionally, risk-based attributes may include indications of whether the employee called the help desk for a password reset more than once during a predetermined period, whether the employee has previously had a virus discovered on their electronic device, etc. These attributes may be used by the workflow appliance 104, for example, to select employees to be participants in a social engineering campaigns and/or testing, to analyze and/or benchmark results of social engineering and/or testing based on attributes, for example, to benchmark across the organization and/or within a segment of the organization. Additionally, in one embodiment, benchmarking and/or analysis of results of social engineering campaigns and/or testing may be conducted relative to other organizations in the same industry as the organization or across different industries.

In one embodiment, the workflow appliance 104 is configured to periodically automatically, e.g., without user intervention, determine from the sources 106 whether any updates have been made to the contact information, e.g., whether any additional employees have been added or removed, whether any contact information has been changed, etc., and to update the contact information record of the workflow appliance 104 accordingly.

In one embodiment, if the workflow appliance 104 determines that address books including contact information for members of the organization stored on a source 106 have been updated, the workflow appliance 104 will automatically import the latest address books and/or latest contact information. In one embodiment, the frequency with which the workflow appliance 104 monitors the address books can be adjusted by a user. Additionally, the workflow appliance 104 may be configured upon detection of updated contact information including a new employee to initiate new employee training, e.g., social engineering susceptibility training, organization-specific training, risk-based surveys, mock social engineering tests, etc.

Figure 2:
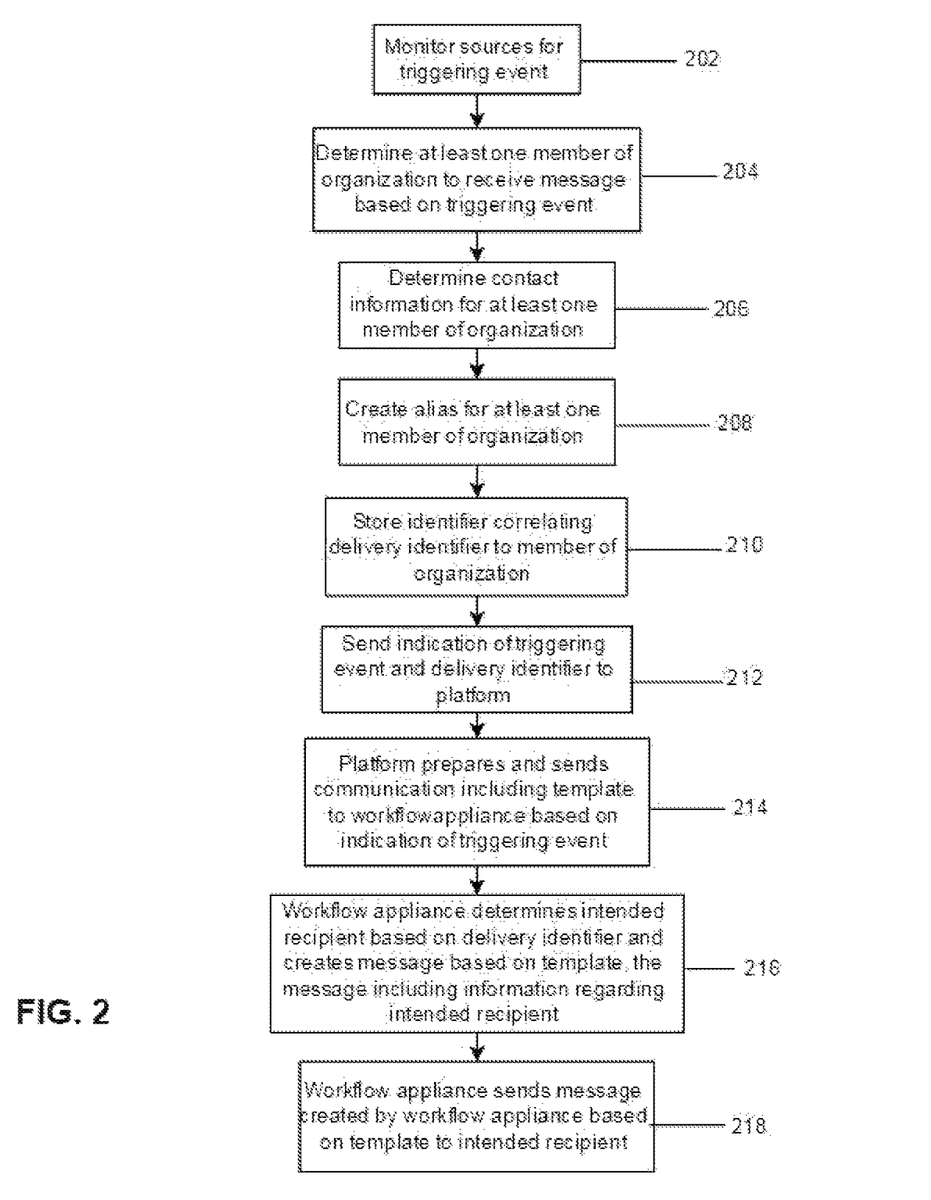
FIG. 2 is flow diagram illustrating a method of operation of the system for testing and/or reducing an organization's susceptibility to social engineering including a workflow appliance of FIG. 1 according to an exemplary embodiment.

Additionally, in one embodiment, the workflow appliance 104 is configured to periodically monitor each of the sources 106 to determine whether triggering events, e.g., risk-based events, etc., have occurred. With reference to FIG. 2, in step 202, the workflow appliance 104 is configured to monitor the sources for triggering events. In step 204, upon detecting a triggering event from one of the sources 106, the workflow appliance 104 is configured to determine, based on the triggering event, a member or group of members of the organization to receive a message. In step 206, the workflow appliance 104 then determines contact information for the member or group of members of the organization to receive the message.

In one embodiment, the workflow appliance 104 is configured to map the contact information, e.g., e-mail address, etc., of each of the members of the organization in the address book to a delivery identifier. In one embodiment, the delivery identifier is a hexadecimal number, e.g., randomly generated, etc. In one embodiment, the delivery identifier is not actual contact information and is not an e-mail address, which may be advantageous in that if the delivery identifier were an e-mail address, a third party possessing the e-mail address could potentially send e-mails to the member of the organization (e.g., not the phishing simulation service provider nor the organization), which may be undesirable. Additionally, the delivery identifier is not a forwarding e-mail address alias.

In step 208, the workflow appliance 104 creates a delivery identifier for each of the intended recipient members of the organization. The delivery identifier is configured to obfuscate the contact information and/or identity of the members of the organization such that this information does not leave the control of the organization and such that the platform 102 cannot determine the contact information and/or identity of each of the members of the organization based on the delivery identifier. In step 210, the workflow appliance 104 is configured to correlate the delivery identifiers to each of the members of the organization that will be intended recipients of the message, e.g., in a lookup table, etc., such that the workflow appliance 104 can determine the contact information and/or identity of each of the members of the organization to receive a message based on the delivery identifiers. In step 212, the workflow appliance 104 is configured to send an indication of the triggering event associated with the delivery identifier and/or delivery identifiers to the platform 102. In step 214, the platform 102 prepares a template based on the indication of the triggering event and sends a communication including the template to the workflow appliance 104. In one embodiment, the template is an e-mail template prepared based on the indication of the triggering event.

In one embodiment, the delivery identifiers are created using cryptographic hash functions. In other embodiments, the delivery identifiers may comprise a unique, non-e-mail address identifier. In another embodiment, the delivery identifiers are randomly generated to avoid information leakage, e.g., if the identities of the members of the organization were organized alphabetically, a non-random delivery identifier such as "user1" could potentially indicate that "user1" was the first member of the organization alphabetically. By providing delivery identifiers that do not provide information to the platform 102, the workflow appliance 104 may avoid information leakage to the platform 102 regarding identities or contact information of the members of the organization.

In one embodiment, the workflow appliance 104 is configured to create messages to the intended recipients based on the template received from the platform 102 and the workflow appliance 104 will send the created messages via e-mail to the intended recipients, as further described below. The platform 102 is configured to insert tags in the template. The tags will indicate to the workflow appliance 104 creating messages locations in the messages in which to include contact information and/or identification information and the type of contact information and/or identification information to be included, e.g., personalize the message.

For example, an e-mail template may include "Hello {emailFirstName:user1@pva}". The platform 102 does not have the contact information or identifying information of the intended recipient. Based on the "Hello {emailFirstName:user1@pva}" the workflow appliance 104 may be configured to create an e-mail that begins "Hello" followed by the first name of the intended recipient, which the workflow appliance 104 has access to, but the platform 102 does not.

The template may also include an indication of a solicitation for the intended recipient to take an action. The workflow appliance 104 may be configured based on the solicitation for example in an e-mail template to include a link to a website in the e-mail. The link contains identifying information that indicates to the workflow appliance 104 the delivery identifier of the member that clicked on the link and was taken to the website. In one embodiment, the platform 102 may be configured to report statistics and/or analysis to the workflow appliance 104, the statistics and/or analysis being reported with relation to the delivery identifiers, and the workflow appliance 104 may be configured to supplement the reported statistics and/or analysis with the actual identities and/or contact information of the members of the organization based on the delivery identifiers.

In step 216, upon receipt of the communication, including the template, from the platform 102, the workflow appliance 104 determines the intended recipient based on the delivery identifier. The workflow appliance 104 creates a message, such as an e-mail message based on the template, the e-mail message including information regarding the intended recipient. For example, if the e-mail template includes "{emailFirstName:user1@pva}", the workflow appliance 104 may be configured to create an e-mail message with the intended recipient's first name in the body of the e-mail message. The workflow appliance 104 may obtain the intended recipient's first name from the intended recipient's e-mail address, from a directory of the organization, etc., however, the platform 102 does not have access to the intended recipient's first name. Additionally, in the example of an e-mail template, the workflow appliance 104 adds e-mail headers and addresses the e-mail message to the intended recipient based on the contact information. In step 218, the workflow appliance 104 sends the e-mail message created based on the e-mail template to the intended recipient. The e-mail message may be accessed and/or interacted with by the recipient through the recipient's electronic device, e.g., computer, smartphone, tablet, etc.

In one embodiment, the workflow appliance 104 is configured to remove all or a subset of the information received regarding the members of the organization from information sent to the platform 102. For example, if the workflow appliance 104 receives telephone numbers for members of the organization, the workflow appliance 104 is configured to replace the telephone numbers with telephone delivery identifiers and to send the telephone delivery identifiers and not the actual telephone numbers to the platform 102. The workflow appliance 104 correlates the telephone delivery identifiers to each of the members of the organization, e.g., in a lookup table, such that the workflow appliance 104 can determine the actual member of the organization and/or actual telephone number of the member of the organization from the telephone delivery identifier. Then, if a telephone phishing awareness campaign is to be launched, the workflow appliance 104 sends the telephone delivery identifier for each of the members of the organization that are intended to participate in the campaign to the platform 102. In response, the platform 102 prepares a template, such as a telephone message template, and sends a communication including the template with the telephone delivery identifier content to the workflow appliance 104. The workflow appliance 104 identifies the telephone number of each intended recipient from the telephone delivery identifier, creates presonalized telephone messages based on the template, and dials the telephone number to deliver the personalized messages, e.g., text message, telephone call, voicemail, recorded message, etc. Thus, the platform 102 does not receive the actual telephone numbers of the members of the organization. In one embodiment, the platform 102 is able to schedule and configure the campaigns independent from the workflow appliance 104. The message is configured to solicit a reply from the member of the organization to the workflow appliance 104 (and not the platform 102), e.g., a telephone number to reach the workflow appliance 104 is included in the message, etc. The workflow appliance 104 receives replies to the messages sent by the members of the organization independent from the platform 102. The workflow appliance 104 is configured to remove information that could be used to identify or contact the member of the organization and/or any confidential information from the replies, and to send the replies with this information removed to the platform 102 for analysis, evaluation, etc. Thus, the platform 102 also does not receive identifying and/or contact information of the members of the organization from the replies by the members of the organization. The platform 102 is still able to schedule and report on the overall results without the identifying/contact or confidential information.

In one embodiment, the workflow appliance 104 is configured to receive information organized by fields from the organization regarding members of the organization. Various fields may include, for example, name, e-mail address, telephone number, mobile phone number, social media identifier, department in the organization, position title, etc. The workflow appliance 104 is configured to create identifiers to correlate with the information in predetermined ones of these fields while leaving the information in other predetermined ones of these fields untouched. The identifiers are used to send to the platform 102 in the place of the actual information and do not contain any identifying and/or contact information for the members of the organization. For example, the workflow appliance 104 may correlate each of an organization member's name, e-mail address, telephone number, mobile phone number, social media identifier, and position title with identifiers while leaving the member's department in the organization untouched, e.g., the platform 102 will receive the actual department in the organization of a member but only identifiers from which no personal or contact information can be determined by the platform 102 for the other fields. The identifiers along with the department in the organization information can be sent by the workflow appliance 104 to the platform 102. The department, or in other embodiments other information unchanged by the workflow appliance 104, may be used by the platform 102 for analysis/evaluation of results of social engineering testing. In one embodiment, the workflow appliance 104 is configured to receive input to determine for which fields the information will and will not be correlated to identifiers before communication of the identifiers to the platform 102 based on an organization's preferences, policies etc.

In one embodiment, the appliance 104 is configured to connect through various application interfaces within the organization to transmit messages, which allows the "Send a Message" functionality to be extended from the platform 102 to the appliance 104 without the platform 102 having access to organizational information that the organization does not want to leave the organization or the organization's control, and without the platform 104 having direct access to the application interfaces within the organization.

In one embodiment, the workflow appliance 104 and the platform 102 communicate using application programmer interfaces, e.g., web services calls, remote procedure calls, etc. Therefore, the platform 102 may communicate messages in the organization through the workflow appliance 104 without knowing the details of the network of the organization to which the workflow appliance 104 is connected. In one embodiment, the workflow appliance 104 extends the platform "Send a Message" function and acts as a SMTP client and communicates with the organization's SMTP server to have the modified message delivered to the intended recipient.

When a triggering event is detected by the workflow appliance 104, the workflow appliance 104 sends the platform 102 information regarding the triggering event, along with a delivery identifier from which the workflow appliance 104 can determine the contact information of an intended recipient of a message, but from which the platform 102 cannot determine the identity of or contact information for the intended recipient. Based on the information regarding the triggering event, the platform 102 generates a communication including a template. The communication is not an e-mail message. The communication includes a template, such as for example and e-mail message template, and a message request. The message request includes information regarding the delivery identifier and a timeframe. The communication is transmitted to the workflow appliance 104 through a secure, e.g., tunneling, non-e-mail connection.

The workflow appliance 104 receives the communication and creates a message, such as an e-mail message, for example, with headers, etc., based on the template received from the platform 102. In one embodiment, the workflow appliance 104 is configured to personalize each message based on information regarding the intended recipient. The workflow appliance 104 then, in one embodiment, uses a self-contained SMTP server to deliver the message that it created based on the template received from the platform 102.

In one embodiment, the company hosting the platform 102 also hosts a secure e-mail server outside of the organization. The workflow appliance 104 is configured to use the secure e-mail server to send e-mail messages created by the workflow appliance 104, based on the e-mail template received from the platform 102, to recipients in the organization. The communications received by the workflow appliance 104 from the platform 102 are not e-mail messages, e.g., are not received through SMTP, etc. The secure e-mail server is not directly accessible by the platform 102. In one embodiment, all messages and logs are periodically deleted from the secure e-mail server.

In one embodiment, the workflow appliance 104 is configured to send an e-mail message, e.g., an e-mail message prepared by the workflow appliance 104 based on an e-mail template received from the platform 102, to a member of the organization. The e-mail message includes a solicitation to respond by e-mail. E-mail responses from members of the organization are configured to be directed to an SMTP server that is not accessible by the platform 102. The SMTP server directs the e-mail responses to the workflow appliance 104 which reviews and/or reads the e-mail responses using IMAP/POP or other similar protocols. The workflow appliance 104 is configured to remove any identifying or contact information of the members of the organization from the e-mail responses, to profile, e.g., hash, etc., confidential and/or other information in the e-mail, and to send the profiled e-mail responses with any contact and/or identifying information removed to the platform 102 for evaluation, analysis, etc. Thus, the platform 102 does not receive identifying, contact, or confidential information from replies to e-mail messages by members of the organization.

In one embodiment, the workflow appliance 104 is configured to send e-mail messages, including links, to intended recipients in the organization. When a link is clicked by the intended recipient, the intended recipient is taken to a webpage served by a landing page server separate from and/or inaccessible by the platform 102. In one embodiment, the workflow appliance 104 includes and/or acts as the landing page server. In another embodiment, the landing page server is separate from the workflow appliance 104 and separate from the platform 102. The link is configured to transmit an identifier, e.g., hexadecimal number, etc., that is correlated to the e-mail message containing the link that was clicked. The workflow appliance 104 is configured to determine (or determine from the landing page server) the e-mail message containing the link that was clicked. The workflow appliance 104 then determines the identity of the member of the organization that received the e-mail with the link that was clicked, replaces the identity with a identifier from which the platform 102 is not able to determine any identifying information regarding the member of the organization, and sends the identifier regarding the link being clicked to the platform 102 for analysis, evaluation, etc. Thus, the platform 102 does not obtain information regarding the actual identity or contact information of the members of the organization that clicked the link. In one embodiment, the landing webpage reached when members of the organization click the link in the e-mail may solicit the member of the organization to enter information into the webpage, e.g., the webpage may contain fields into which information may be typed, etc. The organization may want to gather the information that the member enters into the webpage, but may not want the information to leave the control of the organization. The workflow appliance 104 is configured to gather (if the workflow appliance 104 is acting as the landing page server or to gather from the landing page server if separate from the workflow appliance 104) the information entered by the member of the organization. The information can then be profiled, e.g., hashed, etc., and indicators regarding, for example the amount/type of characters entered etc., and the profiled information can be sent by the workflow appliance 104 to the platform 102 for evaluation, analysis, etc., without the actual underlying information itself leaving the control of the organization.

Various exemplary triggers and workflow appliance/platform responses are described. For example, in one embodiment, when a member of an organization requests a new password from the organization's help desk and/or resets the password, the workflow appliance 104 determines that this triggering event has taken place, e.g., the help desk may have a database in which all requests for new passwords are recorded, etc. The workflow appliance 104, upon detecting the password reset from one of the sources 106 (or, in one embodiment, periodically according to a predetermined schedule of when to proceed for all detected password resets in the predetermined period), contacts the platform 102 and indicates that this type of triggering event has taken place. The platform 102 creates a communication including an e-mail template based on this type of triggering event. The communication also includes a message request including information regarding a delivery identifier from which the workflow appliance 104 can determine an intended recipient and a time frame. The workflow appliance 104 creates an e-mail message, based on the e-mail template, to be e-mailed by the workflow appliance 104 to the member of the organization whose password was reset requesting that the member of the organization click a link in the e-mail and enter the new password information for verification. The e-mail message created by the workflow appliance 104 is created based on the e-mail template and the message request (including information regarding the delivery identifier and timeframe) contained in the communication sent from the platform 102 to the workflow appliance 104.

The communication sent by the platform 102 to the workflow appliance 104 includes an e-mail template and a message request including a delivery identifier, based on which the workflow appliance 104 can determine the identity of the intended recipient of an e-mail message to be created by the workflow appliance 104 and timeframe information, e.g., information regarding when the e-mail message created by the workflow appliance 104 will be sent to the intended recipient. The communication, including the e-mail template, is sent by the platform 102 to the workflow appliance 104 through a secure tunnel connection, e.g., not by SMTP e-mail. The workflow appliance 104 based on the communication received from the platform 102 creates an e-mail message to be sent to the intended recipient member of the organization. If the recipient clicks on the link included in the e-mail message and enters the recipient's password into the landing page website, the landing page informs the recipient that the e-mail message and the landing page are a test, that the recipient would have been the victim of a phishing attack had the e-mail been a genuine phishing attack e-mail instead of a test, and, in one embodiment, suggests training opportunities for the recipient. The workflow appliance 104 profiles, e.g., hashes, (or instructs the website to profile) the password information entered by the recipient and discards (or instructs the website to discard) the confidential password information. The workflow appliance 104 records the profiled information with an identifier from which the workflow appliance 104 can determine the identity and/or contact information of the recipient that provided the confidential information, but from which the platform 102 cannot determine the identity and/or contact information of the recipient.

In another embodiment, when a member of an organization requests a new password from the organization's help desk and/or resets the password, the workflow appliance 104 determines that this triggering event has taken place, e.g., the help desk may have a database in which all requests for new passwords are recorded, etc. The workflow appliance 104, upon detecting the password reset from one of the sources 106 (or, in one embodiment, periodically according to a predetermined schedule of when to proceed for all detected password resets in the predetermined period), contacts the platform 102 and indicates that this type of triggering event has taken place. The platform 102 creates a communication, including an e-mail template for this type of triggering event and a message request including a delivery identifier, based on which the workflow appliance 104 can determine the identity of the intended recipient of an e-mail message to be created by the workflow appliance 104 and timeframe information, e.g., information regarding when the e-mail message created by the workflow appliance 104 will be sent to the intended recipient. The workflow appliance 104 uses the e-mail template to create an e-mail message which is sent by the workflow appliance 104 to the member of the organization whose password was reset requesting that the member of the organization click a link in the e-mail and enter the new password information for verification. The platform 102 sends the communication including the e-mail template to the workflow appliance 104. The workflow appliance 104 creates an e-mail message from the e-mail template and sends the e-mail message to the intended recipient member of the organization. If the recipient clicks on the link and enters the password, the website informs the recipient that the e-mail message and website are a test, that the recipient would have been the victim of a phishing attack had the e-mail been a genuine phishing attack e-mail instead of a test, and, in one embodiment, suggests training opportunities for the recipient. The workflow appliance 104 profiles, e.g., hashes, (or instructs the website to profile) the password information entered by the recipient and discards (or instructs the website to discard) the confidential password information. The workflow appliance 104 records the profiled information and replaces identifying information with an identifier from which the platform 102 cannot determine the identity and/or contact information of the recipient. In this case, the platform 102 uses the workflow appliance 104 to provide updated information and to trigger platform actions.

In one embodiment, the workflow appliance 104 is configured to periodically and/or upon request from a user, contact the platform 102 to receive anonymized, e.g., without identifying information, reports and/or analysis regarding the organization's susceptibility to social engineering and/or social engineering test results. In one embodiment, the workflow appliance 104 is configured to supplement the anonymized reports and/or analysis with identifying and/or contact information based on the identifiers in the report.

Exemplary triggering events may include, for example, new contact information being added to address books, a member of the organization being moved to a different division of the organization, a member of the organization having an anniversary of membership in the organization (e.g., employee having a work anniversary, etc.), a member of the organization requesting resetting of a password, a member of the organization violating a data loss prevention rule, a member of the organization forwarding a suspicious e-mail to the help desk, a user completing training, a user changing jobs status or roles, managers having events triggered based on their subordinates, a user getting locked out of a system for too many login attempts, a user taking time off work, a user getting written up for an HR violation, safety warning/accidents, reorganization of a company, layoffs, subcontractors on boarding/exiting, etc. Other exemplary trigger events may include an individual visiting or attempting to visit a known phishing web site, visiting or attempting to visit a suspected phishing web site, receiving phishing e-mails or communications, or being the intended recipient of a phishing email or communication that is intercepted by an inbound message filter. In particular, identification of spearphishing emails or communications directed to a particular individual can be a triggering event. Additional triggering events may include an individual ignoring or failing to respond to training invitations, prior or pending changes to consulting or employment contracts or status, or classification in an identifiable group based on personality, IQ, physical, or other personal attributes that can be objectively tested.

The workflow appliance 104 monitoring the sources 106 allows risk based user attributes to be merged from multiple database sources. For example, a human resources database may include contact information for all members of the organization, a help desk database may include all requests for new passwords, reports of IT issues, lists of new viruses discovered, and as such the workflow appliance 104 may use information from the help desk database, such as a request for a new password to automatically trigger the workflow appliance 104 to contact the platform 102 to launch a campaign to reduce susceptibility to social engineering. Because various different sources 106 are being monitored by the workflow appliance 104, various different triggers can be observed by the workflow appliance 104 which can automatically, e.g., without user intervention, direct the platform 102 to launch different campaigns, tests, etc., to different members of the organization through the workflow appliance 104 based on the type of trigger observed.

In one embodiment, the workflow appliance 104 is configured to make outbound connections with the platform 102, e.g., without the organization opening any incoming ports, and, therefore, no modifications to the organization's firewall may be necessary. In one embodiment, the workflow appliance 104 is configured to use encrypted tunnel technology, e.g., VPN, SSH, etc., to make an outgoing connection and/or tunnel with the platform 102. The workflow appliance 104 and the platform 102 are then able to communicate securely communicate through the tunnel with the data transmitted between the workflow appliance 104 and the platform 102 being encrypted. Messages are sent by the platform 102 to the workflow appliance 104 through the tunnel and not, for example, by e-mail, etc.

In one embodiment, multiple workflow appliances, as described above, may be provided for an organization, e.g., different workflow appliances for different divisions of the organization, etc.

In one embodiment, the workflow appliance 104 may include memory configured for caching information from the platform 102. For example, large files, e.g., multimedia training files, etc., may be cached in the memory of the workflow appliance 104 for quick and/or easy access inside the organization without the need to download the large files from, for example, the platform 102, each time the large files are to be used and/or accessed.

In one embodiment, workflow appliances as described above act as a black box to the organization running inside the organization's network on the organization's virtual infrastructure.

In one embodiment, the platform 102 is configured to create a website, a link to which is sent in an e-mail template to the workflow appliance 104. The website may include information indicative to someone being linked to the website that the web site is legitimate. Additionally, the website may include a field configured to receive information such as confidential information from a user and a request that the user provide confidential information.

Figure 3:
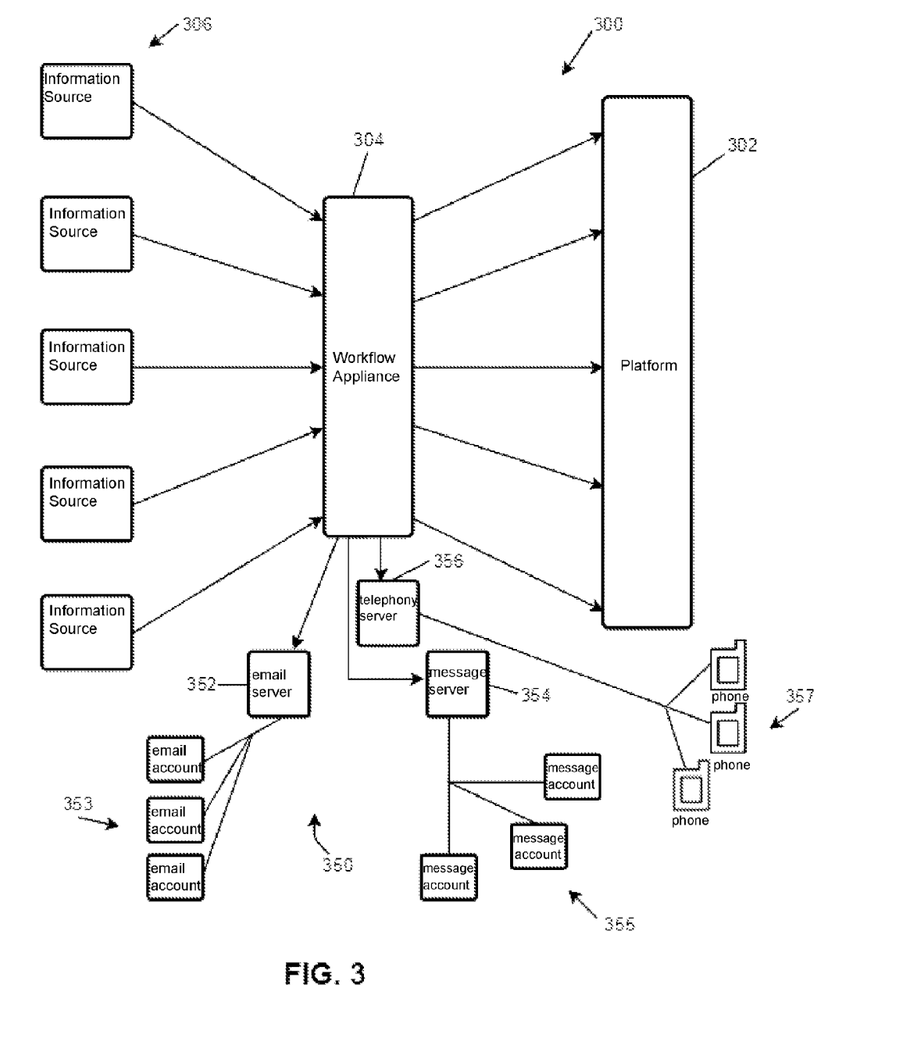
FIG. 3 is a block diagram illustrating a system for testing and/or reducing an organization's susceptibility to social engineering including a workflow appliance according to an exemplary embodiment.

With reference to FIG. 3, another embodiment of a system 300, such as a system for evaluating and/or reducing the susceptibility of an organization to social engineering, is illustrated. The system 300 allows for analyzing and evaluating in a software as a service environment, e.g., remote from the client organization, data from testing of the organization's members without the algorithms and source code to conduct the analysis and evaluation of the data being given to the organization, but also without any confidential information, sensitive information, contact information, or member-identifying information leaving the control of the organization. The system 300 has many similarities to the system 100 described above, therefore, other features are the focus of the description below.

In one embodiment, the system 300 includes a platform 302 remote from the organization, e.g., not under the control of the organization. The platform 302 includes processors programmed to generate and/or retrieve messages for social engineering testing and to evaluate and analyze responses to the messages and results of the testing. The system 300 also includes a workflow appliance 304. In one embodiment, the workflow appliance 304 is located at the physical location of the organization, running on the organization's infrastructure, or otherwise under the control of the organization. The workflow appliance 304 is in communication with sources 306 of information of the organization, e.g., similar to the sources 106 described above. The workflow appliance 304 receives an address book from the organization. The address book includes identifying information of members of the organization, e.g., names, departments, position titles within the organization, etc. Additionally, the address book includes contact information of the members of the organization, e.g., e-mail addresses, telephone numbers, mobile phone numbers, social media identifiers, etc. If the organization does not want confidential information, such as the information in the address book, to leave the control of the organization, the appliance 304 is configured to alias at least portions of the identifying information of the address book and to create delivery identifiers for the contact information of the address book, but also to create and retain information sufficient to identify the entry in the un-aliased address book from the aliased information and delivery identifiers, e.g., create lookup tables, etc.

In one embodiment, the aliasing of the information in the address book includes random mapping. Thus, for example, if more than one member of the organization has the first name "John," the aliased first name of each "John" in the organization will be a different aliased value, e.g., different 30-digit hexadecimal number or any other suitable alias, which prevents leakage of information, e.g., prevents information regarding the actual identities or contact information of the members of the organization from being determined based on the aliased information.

The appliance 304 is configured to contact and communicate with the platform 302 over the internet in a secure manner, e.g., tunneling as described above, etc. When the appliance 304 detects a triggering event from the sources 306 in the organization, the appliance 304 is configured to send information regarding the triggering event along with delivery identifiers for the members of the organization to be contacted in response to the triggering event to the platform 302, e.g., the platform 302 does not receive actual contact information for the members of the organization to be contacted in response to the triggering event. In one embodiment, any identifying information regarding the members of the organization that is sent to the platform 302 is aliased prior to the platform 302, such that the platform 302 is unable to determine any identifying information regarding the members of the organization. Contact information is not sent to the platform 302, but instead delivery identifiers (from which the platform 302 cannot determine actual contact information for members of the organization) are sent to the platform 302. In another embodiment, only some of the identifying information regarding the members of the organization to be sent to the platform 302 is aliased while other portions of the identifying information may be un-aliased and recognizable by the platform 302, e.g., department of the organization in which the member works may be un-aliased, etc.

The platform 302 retrieves and/or creates a communication, including a template, such as an e-mail template, based on the information regarding the triggering event received from the workflow appliance 304. In one embodiment, the platform 302 sends the communication, including the template to the workflow appliance 304, with the template including generic tags indicative to the workflow appliance 304 of the type of information that the workflow appliance 304 is to include in messages created by the workflow appliance 304 based on the template to personalize the message for the intended recipient, e.g., an e-mail template may include a greeting of "Hello, e-mail first name" based on which the workflow appliance 304 will retrieve the first name of each intended recipient from the address book and insert the name into each e-mail created for the intended for that intended recipient based on the e-mail template. In another embodiment, the platform 302 is configured to insert the aliased information into the template, e.g., substituting the e-mail template greeting of "Hello, e-mail first name" with "Hello, aliased value of e-mail first name from aliased address book received from appliance."

In various embodiments, other types of templates, e.g., script templates for audible messages, templates for text messages, etc., may be created by the platform 302 and sent to the workflow appliance 304, and the workflow appliance 304 may be configured to create other types of messages based on the other types of templates, e.g., audible messages, written messages, text messages, etc.

The appliance 304 receives the communication, including the template, from the platform 302 and determines the intended recipient for the message to be created based on the template. The appliance 304 then finds and replaces either the tags in the message or, in the case of aliased information inserted by the platform 302, replaces the aliased information with actual information regarding the intended recipient from the address book. In the embodiment in which the platform 302 has inserted aliased information into the template, once the appliance 304 determines the intended recipient for the message, the appliance 304 looks up each portion of aliased information in the template and enters corresponding actual information from the address book in the message created by the appliance 304 based on the template, e.g., changes "aliased first name" to "actual first name," "aliased last name" to "actual last name," "aliased job title" to "actual job title," etc. If one of the aliased values does not match the aliased value in the look up table correlating the aliased values for that intended recipient to the actual information in the address book, the appliance 304 will recognize and/or remedy the error. For example, if the appliance 304 determines that the intended recipient for a message is "John Smith" and the aliased value for John Smith's first name in the look up table is "XYZ" and the platform 302 has inserted into the message that the aliased first name is instead "ABC," the appliance 304 will recognize that the aliased value does not correspond to the intended recipient and will not insert a first name of a different recipient with the aliased first name "ABC."

Once the appliance 304 has created personalized messages based on the template using information from the address book, the appliance 304 is configured to send the personalized messages, e.g., over the internet, over a secure connection, etc., to one of a plurality of servers 350 based on the type of the message. For example, if the messages are e-mail messages, the appliance 304 is configured to send the messages to an e-mail server 352. The e-mail server 352 then serves the e-mails to the intended recipients' e-mail accounts 353. If the messages are text messages, the appliance 304 is configured to send the messages to a text message server 354. The text message server then serves the text messages to the intended recipients' text message accounts. If the messages are audible messages, e.g., voicemails, etc., or if a text version of the message is to be spoken by a computerized text-to-speech converter, the appliance 304 is configured to send the messages to a telephony server 356. The telephony server 356 then serves the audible messages the intended recipients' telephones 357.

In one embodiment, the servers 352, 354, 356 are included in the workflow appliance 304, e.g., the workflow appliance 304 itself includes and/or acts as the servers 352, 354, 356. In another embodiment, the servers 352, 354, 356 are separate from, but in communication with the workflow appliance 304, and are also separate from and inaccessible by the platform 302.

In one embodiment, the messages solicit a response from the recipient. The response solicited may be over the same medium, e.g., audible, text, e-mail, as the initial message or may be over a different medium. The workflow appliance 304 is configured to monitor and collect the responses to the messages by the recipients, e.g., through the servers 350, etc. The appliance 304 is configured to review each received response, alias predetermined information received in the response that the organization does not want to leave the organization's control, leave other predetermined information received in the response that the organization does not require to be kept under the organization's control un-aliased, and to profile some predetermined information received in the response, for example, in one embodiment, information that cannot be aliased. The appliance 304 is then configured to send the aliased portions, un-aliased portions, and profiled portions of each response to the platform 402 for analysis and/or evaluation. Therefore, confidential information is kept within the organization's control and not presented to the platform 302. The platform 302 analyzes the responses and prepares reporting, e.g., reporting regarding results, effectiveness, etc., of social engineering test and/or training. The appliance 304 receives that reporting with the aliased and profiled information and updates the reporting to replace the aliased information with actual information, e.g., from the address book, and to replace the profiled information with the actual information, for example, so that the reporting can be reviewed by certain members of the organization. Thus, the reporting provided by the appliance to the organization can include personally identifying information that is not available to the platform.

For example, if a voicemail message is sent out to members of the organization requesting that recipient call telephone number "XXX-XXX-XXX," enter code "YYYY," and leave a voicemail providing the person's new computer password, the appliance 304 is configured to monitor the telephony server 356 for telephone calls. When a call is received from a member of the organization, the appliance 304 is configured to recognize the telephone number from which the member is calling using the address book. The appliance 304 will alias this telephone number information so that the platform 302 does not receive the member's actual telephone number. The appliance 304 will also collect the "YYYY" code entered by the member of the organization. However, since this information is not confidential, e.g., was generated by the system, such as by the platform 302 when the message was originally generated, this information may be passed through to the platform 302 and is not aliased by the appliance 304. The appliance 304 also collects the member of the organization's audible message, e.g., as a .wav file or any other suitable type of file. The audible message may contain confidential information but is not aliased (in other embodiments, the audible messages may be converted to text using automated or manual speech recognition techniques and the appliance 304 may be configured to alias the resulting text). Instead, the appliance 304 is configured to profile information regarding the audible message e.g., message length, the number of seconds of non-silent recording, volume levels, estimated number of syllables in the audio file, combinations thereof, etc., to save the message itself, and not to send the message itself to the platform 302. The profiled information can be passed to the platform 302 such that confidential information does not leave the organization. Thus, the appliance 304 is configured to review collected responses from members of the organization and to alias some information from the responses, to leave other information from the responses un-aliased, and to profile other information from the responses according to a predetermined algorithm and without user intervention. In one embodiment, the appliance 304 is configured to receive instructions from an organization to determine which information is to be aliased, which information is to be left un-aliased, and which information is to be profiled according to the organization's specifications.

In one embodiment, the communication provided by the platform 302 to the workflow appliance 304 includes a delivery mode indicator, e.g., indicating the type of message that the workflow appliance 304 will create based on the template and/or the medium, e.g., telephone, e-mail, SMS, etc., through which the workflow appliance will deliver the message created based on the template. In one embodiment, the communication provided by the platform 302 includes scheduling instructions, e.g., indicating to the workflow appliance 304 when to create and send the message, what to do if the message is undeliverable, e.g., busy signal, bounce notice, etc., (for example, the communication includes sufficient information so that the workflow appliance 304 knows how many times it should call back or retry, at what times of day, days of the week, etc., are allowed or not allowed for sending messages, and how to ask the platform 302 for further instructions).

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, values of parameters, arrangements, use of materials, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

In various embodiments, the platform and workflow appliance described herein may include a general purpose processor, an application specific processor, a circuit containing one or more processing components, a group of distributed processing components, e.g., distributed computers configured for processing, etc. Embodiments of platforms and workflow appliances may be or include any number of components for conducting data processing and/or signal processing. According to an exemplary embodiment, any distributed and/or local memory device may be utilized with and/or included in the systems, methods, appliances, and platforms of this disclosure. In one embodiment, a workflow appliance or platform may include memory communicably connected to a processor or a tool (e.g., via a circuit or other connection) and may include computer code for executing one or more processes described herein.

In various embodiments, the platform and/or workflow appliance may be implemented in software. In another embodiment, the platform and/or workflow appliance may be implemented in a combination of computer hardware and software. In various embodiments, systems implementing the platform and/or workflow appliance discussed herein include one or more processing components, one or more computer memory components, and one or more communication components. In various embodiments, the platform and/or workflow appliance may include a general purpose processor, an application specific processor (ASIC), a circuit containing one or more processing components, a group of distributed processing components, a group of distributed computers configured for processing, etc., configured to provide the functionality discussed herein. In various embodiments, the platform and/or workflow appliance may include memory components such as one or more devices for storing data and/or computer code for completing and/or facilitating the various processes described in the present disclosure, and may include database components, object code components, script components, and/or any other type of information structure for supporting the various activities described in the present disclosure. In various embodiments, the communication components described herein may include hardware and software for communicating data for the system and methods discussed herein. For example, communication components may include wires, jacks, interfaces, wireless communications hardware etc., for receiving and transmitting information as discussed herein. In various specific embodiments, the platform, workflow appliance, and/or methods described herein, may be embodiment in nontransitory, computer readable media, including instructions (e.g., computer coded) for providing the various functions and performing the various steps discussed herein. In various embodiments, the computer code may include object code, program code, compiled code, script code, executable code, instructions, programmed instructions, nontransitory programmed instructions, or any combination thereof. In other embodiments, workflow appliances and/or platforms described herein may be implemented by any other suitable method or mechanism. In one embodiment, the workflow appliance described above may be local, e.g., at the same physical location as the organization, or implemented on computer hardware under the control of the organization. In other embodiments, the workflow appliance and/or platform may be remote from, e.g., not at the same physical location as, the organization.

In one embodiment, workflow appliances described herein may be implemented in software stored and/or hosted local to client organizations. In various embodiments, workflow appliances described herein may be implemented in the cloud, via distributed computing, as software hosted on servers remote from client organizations, not at the same physical location as client organizations, etc.

What is claimed is:

1. A method of reducing organizational susceptibility to social engineering, the organization having a plurality of sources, the method comprising:
   receiving, via a computer appliance, contact information for a plurality of members of the organization;
   monitoring, via the computer appliance, each of the sources for triggering events;
   receiving, via a computer platform remote from the computer appliance, signals from the computer appliance indicative of detected triggering events and delivery identifiers associated with the detected triggering events, wherein the computer platform creates different templates for detected triggering events having different characteristics;

preparing, by the computer platform, communications including templates based on each of the detected triggering events, wherein the computer platform compiles information regarding detected triggering events and evaluates susceptibility of the organization to social engineering based on the detected triggering events, and wherein the computer platform does not receive the contact information of the plurality of members from the computer appliance;

transmitting, by the computer platform, the communications including the templates to the computer appliance;

including a tag in at least one of the templates on the computer platform;

identifying, via the computer appliance, at least one member of the organization as an intended recipient based on one of the detected triggering events;

preparing, by the computer appliance, a message to the intended recipient based on characteristics of the one of the detected triggering events, the message soliciting an action by the intended recipient;

adding, by the computer appliance, information into the message regarding the intended recipient of the message based on the tag;

transmitting the message, using the computer appliance, to the intended recipient;

determining, by the computer platform, whether the intended recipient acts as solicited by the message; and evaluating, by the computer platform, the action of the intended recipient.

2. The method of claim 1, wherein the sources include at least one directory, at least one database, and at least one messaging system.

3. The method of claim 1, wherein the contact information includes an e-mail address book including e-mail addresses for members of the organization, the method further including periodically determining from at least one of the sources whether the e-mail address book for the members of the organization has been updated.

4. The method of claim 1, wherein the contact information includes at least one of telephone numbers for members of the organization for voice phishing testing, mobile phone numbers by which short message service (SMS) texting messages may be transmitted to members of the organization, and social media identifiers for members of the organization.

5. The method of claim 1, wherein the delivery identifiers do not provide information to the computer platform.

6. The method of claim 1, further including the steps of utilizing the computer appliance inside a firewall of the organization and utilizing the computer platform outside the firewall of the organization.

7. The method of claim 1, further including the steps of:
aliasing, by the computer appliance, at least some identifying information for the plurality of members;
replacing the contact information with identifiers to create an aliased address book; and
receiving the aliased address book via the computer platform.

8. The method of claim 1, further including the steps of:
monitoring, using the computer appliance, a response to the message from the intended recipient;
aliasing, via the computer appliance, portions of the response and leaving other portions of the response un-aliased;
profiling portions of the response based on a predetermined algorithm; and
sending the aliased, un-aliased, and profiled portions of the response to the computer platform.

9. The method of claim 1, further including the step of compiling, using the computer platform, statistics regarding one or more triggering events, one or more messages, and one or more actions taken in response to the one or more messages.

* * * * *